E. E. NORTON.
CLUTCH.
APPLICATION FILED FEB. 12, 1907.
No. 903,493.
Patented Nov. 10, 1908.
3 SHEETS—SHEET 1.
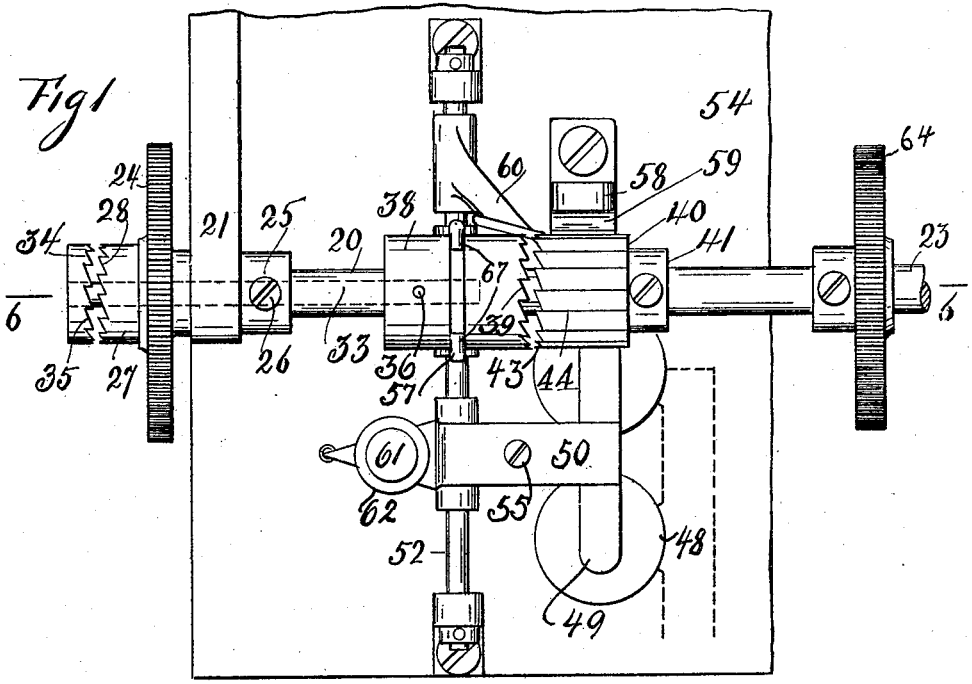
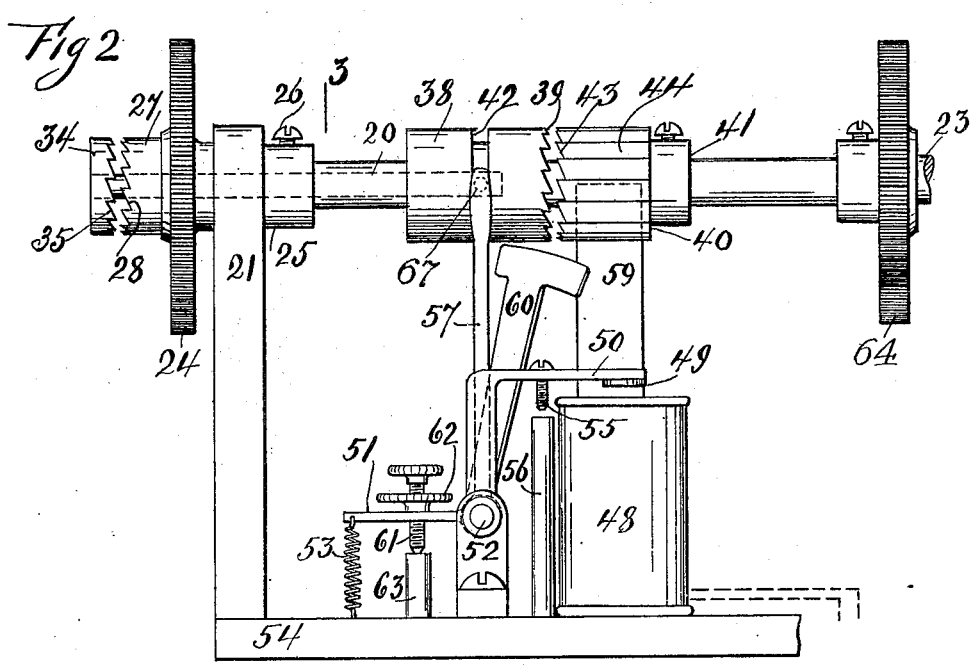
Witnesses:
J. A. Whiteman
Sigmund Schuler
Inventor
Eugene E. Norton
By his Attorney
A. de Romerville E. E. NORTON.
CLUTCH.
APPLICATION FILED FEB. 12, 1907.
903,493.
Patented Nov. 10, 1908.
3 SHEETS—SHEET 2.
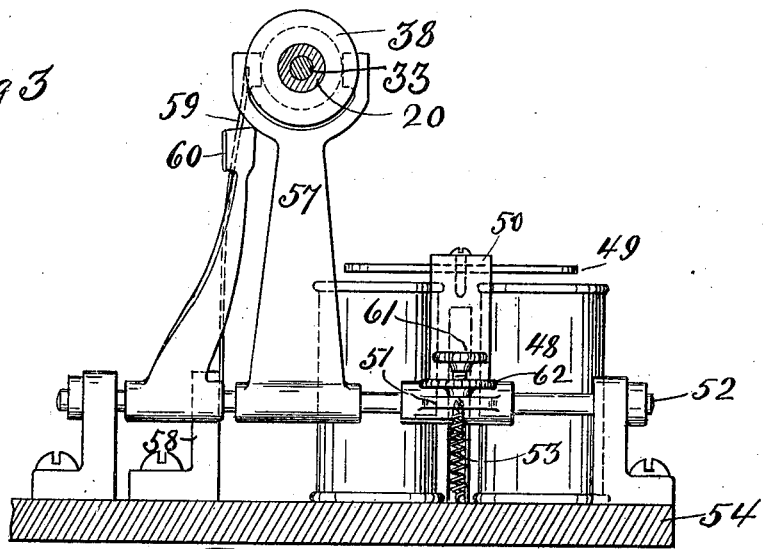
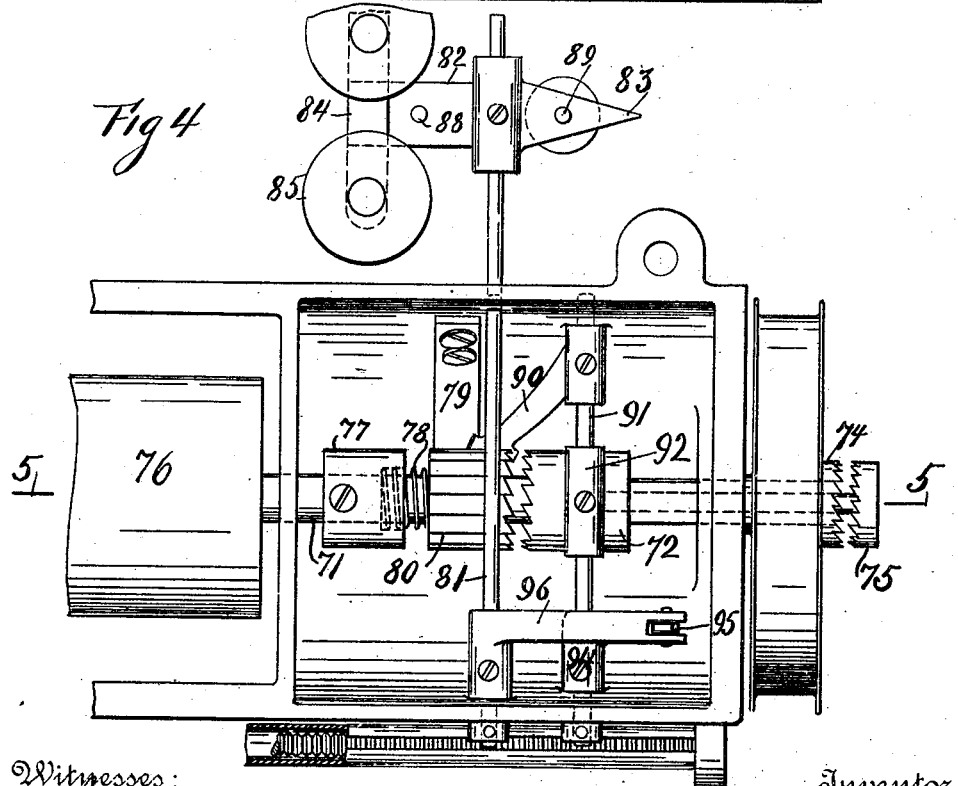
Witnesses:
J. A. Whitman
Sigmund Schuler
Inventor
Eugene E. Norton
By his Attorney

E. E. NORTON.
CLUTCH.
APPLICATION FILED FEB. 12, 1907.

903,493.

Patented Nov. 10, 1908.
3 SHEETS—SHEET 3.

Witnesses:
J. A. Whitman
Sigmund Schuler

Inventor
Eugene E. Norton
By his Attorney
A. A. de Bonneville

UNITED STATES PATENT OFFICE.

EUGENE E. NORTON, OF BRIDGEPORT, CONNECTICUT, ASSIGNOR, BY MESNE ASSIGNMENTS, TO CAMERAPHONE COMPANY, OF NEW YORK, N. Y., A CORPORATION OF ARIZONA TERRITORY.

CLUTCH.

No. 903,493.

Specification of Letters Patent.

Patented Nov. 10, 1908.

Application filed February 12, 1907. Serial No. 356,949.

*To all whom it may concern:*

Be it known that I, EUGENE E. NORTON, a citizen of the United States, and a resident of Bridgeport, in the county of Fairfield and State of Connecticut, have invented certain new and useful Improvements in Clutches, of which the following is a specification.

This invention relates to a clutch, and its object is to produce a device with appurtenances connected therewith, that the members of the clutch can be engaged or disengaged in a very small unit of time.

Figure 5:
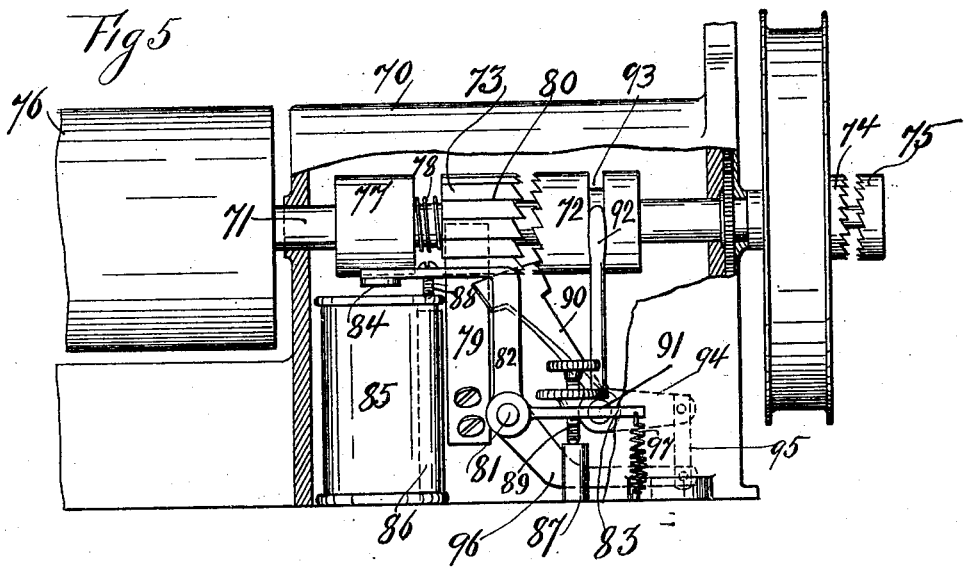
Figure 6:
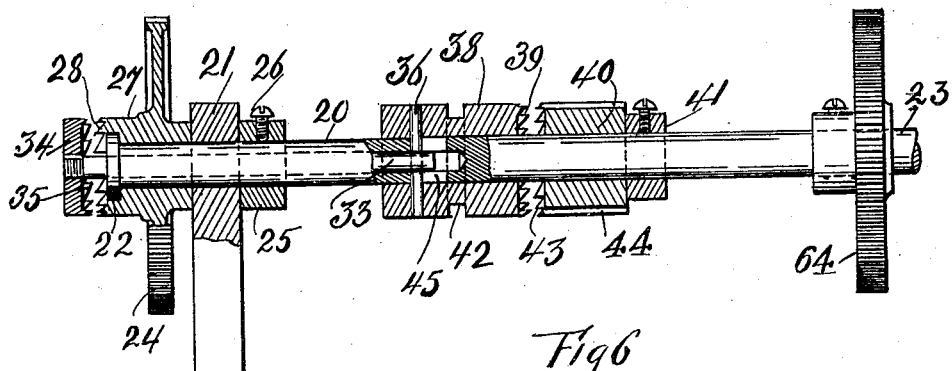

Referring to the drawings Figure 1 represents a plan view of a device arranged for a picture machine or kinetoscope exemplifying the invention, Fig. 2 shows a front view of Fig. 1, Fig. 3 is a section of Fig. 2 on the line 3, 3, Fig. 4 is a bottom plan view of a portion of a talking machine or phonograph with the clutch and its appurtenances somewhat magnified attached thereto, Fig. 5 shows a partial section of Fig. 4 on the line 5, 5, Fig. 6 represents a partial section of Fig. 1 on the line 6, 6.

In the drawings there is represented a hollow shaft 20 which is journaled in the bracket 21. It has the collar 22 at one end, and the end 23 is supported by a mechanism not shown and to which the said shaft communicates motion. A driving gear 24 is journaled on the said shaft between the collar 22 and bracket 21, a collar 25 fastened to the shaft 20 by the screw 26 coacts with the collar 22 to prevent any lateral movement of the shaft. The hub 27 of the wheel 24, has extending from one of its end faces clutch teeth 28, of what I term the main clutch. A spindle 33 is supported in the hollow shaft 20, and it carries a member 34 of the main clutch with the teeth 35 that can engage with the teeth 28 of its accompanying member. A pin 36 extends from the spindle 33 and engages with a member 38 of a secondary clutch having the clutch teeth 39 and groove 42. An elongated opening 45 in the hollow shaft 20 allows the pin 36 to move therein. A second member 40 of the secondary clutch is journaled on the shaft 20, and a collar 41 fastened to the shaft 20 maintains the member 40 in proper lateral position. The clutch member 40 has the clutch teeth 43 at one of its end faces, and the ratchet teeth 44 on its circumferential surface.

Adjacent to the shaft 20 is located a magnet 48, with the armature 49 extending from the bell crank with the arms 50 and 51. A spindle 52 supports the said bell crank. A spring 53 between the end of the arm 51 and the base 54 of the machine keeps the armature separated from the core of the magnet when no current is passing through the coils of the spool of the magnet. A screw 55 in the arm 50 of the bell crank is arranged to abut against the post 56 to control the stroke of the arm 50. On the spindle 52 is fastened a yoke 57 which engages with the groove 42 in the member 38 of the secondary clutch, the forked ends 67 of the yoke 57 are somewhat less in diameter than the width of the groove 42. On a bracket 58 extending from the base 54 is fastened the pawl or spring 59 which engages with the ratchet teeth 44 of the member 40 of the secondary clutch. A disengaging arm 60 is fastened to the spindle 52 and can be moved against the pawl or spring 59. A screw 61 is threaded through the lower arm 51 of the bell crank and a nut 62 is carried on the said screw. A post 63 extends up from the base 54 under the end of the screw 61, which latter with the post 63 controls the stroke of the arm 51 and the tension of the spring 53. A gear 64 is fastened on the right hand end of the shaft 20.

In Figs. 4 and 5 the clutch is shown slightly modified and connected with a talking machine. A portion of the frame of a talking machine is represented at 70 in which is journaled a shaft 71 similar to the shaft 20. The shaft 71 carries members 72 and 73 of a secondary clutch similar to 38 and 40, and members 74 and 75 similar to 27 and 34. The shaft 71 carries the cylindrical record 76. A collar 77 is fastened to the shaft 71 and a spring 78 bears between the member 73 and said collar. A spring 79 extends up from the frame 70 and engages with the ratchet teeth 80 of the member 73. A spindle 81 is supported in the frame 70, which carries a bell crank with the arms 82 and 83. An armature 84 extends from the arm 82 for the magnet 85. Posts 86 and 87 are located under screws 88 and 89, which latter are held in the arms of the bell crank. A disengaging arm 90 extends from a spindle 91 and can bear against the spring 79. A yoke 92 extends from the spindle 91 which engages with the groove 93 of the member 72. An arm 94 also extends from the spindle 91 and a link 95 connects the arm 94 with arm 96 which latter is fastened to the spindle 81. The arm 83 has at its end a spring 97.

To operate the invention and referring to Figs. 1, 2, 3 and 6, power is transmitted to the gear 24 which latter is kept continuously rotating, and supposing no current to be passing through the magnet 48 the armature 49 will be raised up from said magnet and the member 34 of the main clutch will be separated from its accompanying member 27. At the same time the spring 59 will be in engagement with the ratchet teeth 44 of the member 40 and prevent the latter turning. Now when the magnet 48 becomes active the armature 49 is pulled down which causes the arm 60 to bear against the spring 59 disengaging the latter from the member 40 just an instant before the members of the secondary clutch become engaged, by reason of the clearance between the ends 67 of the yoke 57 and the groove 42 in the member 38. When the members 38 and 40 become engaged, the members 27 and 34 also become engaged and thereby the rotations of the gear 24 are transmitted to the gear 64. Now when it is desired to instantly and smoothly disengage the members 27 and 34 of the main clutch, the current through the magnet is opened which raises the armature 49 and thereby the arm 60 disengages itself from the spring 59 which latter then at once engages with the ratchet teeth 44 of the member 40, preventing it turning, and the member 38 turning the teeth 39 of the latter will instantly and without tremor turn or creep out of engagement with the teeth 43 of the member 40.

Having described my invention, I claim:

1. In a clutch the combination of a pair of main engaging members, a pair of secondary engaging members coacting therewith, an element located to engage one of the latter pair of members, a second element operating in the path of the first element to disengage said first element from the secondary engaging member.

2. In a clutch the combination of a pair of main engaging members, a pair of secondary engaging members coacting therewith, ratchet teeth on one of the latter members, a pawl located to engage said teeth, a disengaging arm adjacent to the pawl, means to bear the arm against the pawl, and thereby separate the latter from the said ratchet teeth.

3. The combination of a hollow shaft, a member of a main clutch journaled thereon, a spindle supported in the hollow shaft and axially movable thereto, an accompanying member of said main clutch extending from the spindle, a first member of a secondary clutch on the hollow shaft, a connection between the said first member and the spindle, an accompanying member of the secondary clutch journaled on the shaft, and means to lock the accompanying member of the secondary clutch, thereby disengaging its members and the members of the main clutch.

4. The combination of a hollow shaft, a member of a main clutch journaled thereon, a spindle supported in the hollow shaft and axially movable thereto, an accompanying member of said main clutch extending from the spindle, a first member of a secondary clutch on the hollow shaft, a connection between the said first member and the spindle, an accompanying member of the secondary clutch journaled on the shaft, ratchet teeth on the said accompanying member of the secondary clutch, a pawl in engagement with said teeth, a disengaging arm adjacent to the pawl, a spindle supporting the disengaging arm, a magnet adjacent to the latter spindle, a bell crank fastened to the latter spindle, an armature for the magnet carried on the bell crank, means to excite the magnet and thereby attract the armature to said magnet, oscillating the latter spindle to disengage the pawl from the ratchet teeth with which it is connected.

5. The combination of a pair of members of a main clutch, a hollow shaft supporting one of said members, a spindle in said shaft fastened to the other member, a secondary clutch on the said shaft, one of the members thereof journaled on the shaft, the other member supported on the shaft and connected with the said spindle, ratchet teeth on the member of the secondary clutch which is journaled on the shaft, a pawl in engagement with said teeth, an oscillating spindle supported adjacent to the secondary clutch, a yoke extending from the latter spindle and engaging with the member of the secondary clutch that is connected with the spindle in the hollow shaft, a disengaging arm on the oscillating spindle, a magnet adjacent to the oscillating spindle, an armature for the magnet, and a connection between said armature and the oscillating spindle.

6. The combination of a pair of members of a main clutch, a gear on one of said members, a hollow shaft supporting one of said members, a spindle in said shaft fastened to the other member, a secondary clutch on the said shaft, one of the members thereof journaled on the shaft, the other member supported on the shaft and connected with the said spindle, ratchet teeth on the member of the secondary clutch which is journaled on the shaft, a pawl in engagement with said teeth, an oscillating spindle supported adjacent to the secondary clutch, a yoke extending from the latter spindle and engaging with the member of the secondary clutch that is connected with the spindle in the hollow shaft, a disengaging arm on the oscillating spindle, a magnet adjacent to the oscillating spindle, an armature for the magnet, a connection between said armature and the oscillating spindle, and electric conductors for the magnet.

Signed at the borough of Manhattan in the county of New York and State of New York this 9th day of February A. D. 1907.

EUGENE E. NORTON.

Witnesses:
J. A. WHITMAN,
MARTIN ZIMANSKY.